United States Patent
Childress et al.

(10) Patent No.: US 7,978,730 B2
(45) Date of Patent: *Jul. 12, 2011

(54) CONTROLLING SOFTWARE DISTRIBUTION OR FILE TRANSFER

(75) Inventors: Rhonda L. Childress, Austin, TX (US); David Bruce Kumhyr, Austin, TX (US); Neil Raymond Pennell, Cedar Creek, TX (US); Thomas Michael Ruiz, Universal City, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/610,436

(22) Filed: Nov. 2, 2009

(65) Prior Publication Data
US 2010/0046392 A1 Feb. 25, 2010

Related U.S. Application Data

(63) Continuation of application No. 11/039,733, filed on Jan. 20, 2005, now Pat. No. 7,630,400.

(51) Int. Cl.
*H04J 3/16* (2006.01)
(52) U.S. Cl. .................................................. 370/468
(58) Field of Classification Search .................. None
See application file for complete search history.

(56) References Cited

U.S. PATENT DOCUMENTS

| | | | |
|---|---|---|---|
| 6,119,165 | A | 9/2000 | Li et al. |
| 6,314,105 | B1 * | 11/2001 | Luong .................. 370/395.2 |
| 6,449,688 | B1 | 9/2002 | Peters et al. |
| 6,614,804 | B1 | 9/2003 | McFadden et al. |
| 6,687,735 | B1 | 2/2004 | Logston et al. |
| 6,711,557 | B1 | 3/2004 | Palaniappan |
| 6,947,396 | B1 * | 9/2005 | Salmi ......................... 370/310 |
| 2002/0099844 | A1 * | 7/2002 | Baumann et al. .......... 709/232 |
| 2002/0184375 | A1 * | 12/2002 | Wagner et al. ............. 709/229 |
| 2006/0159127 | A1 | 7/2006 | Childress et al. |

OTHER PUBLICATIONS

Larson, Michael, "Probing Network Characteristics: A Distributed Network Performance Framework", Dr. Dobb's Journal, Jun. 2004, pp. 22-29.

* cited by examiner

*Primary Examiner* — Chirag G Shah
*Assistant Examiner* — Yong Zhou
(74) *Attorney, Agent, or Firm* — Stephen J. Walder, Jr.; Mark Vallone

(57) ABSTRACT

An example of a solution provided here comprises automatically measuring bandwidth of a network connection; comparing results of the measuring, with bandwidth parameters; preventing a transfer of a file via the network connection, if measured bandwidth is less than a minimum acceptable value; providing to an end user an option of transferring a file via the network connection, if measured bandwidth is not less than a minimum acceptable value, but is less than an optimal value; and automatically transferring a file via the network connection, if measured bandwidth is greater than or equal to an optimal value.

18 Claims, 4 Drawing Sheets

CONTROLLING SOFTWARE DISTRIBUTION OR FILE TRANSFER

This application is a continuation of application Ser. No. 11/039,733, filed Jan. 20, 2005, now U.S. Pat. No. 7,630,400.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to multiple computers or processes, and more particularly to methods and systems of controlling software distribution or file transfer.

BACKGROUND OF THE INVENTION

Problems of uncontrolled file transfer may arise in communications among widely dispersed computers. Available bandwidth may vary according to the amount of traffic in a network. Various network connections have varying capacities to handle software distribution or other file transfer. Unfortunately, not every user knows or understands the available bandwidth. Traveling users with notebook computers may have little choice or information about the available network connections.

If a large file is transferred, when available bandwidth is low, the amount of time it would take to transfer the large file could be extreme. This may be annoying or costly for the end user, who may be paying for connection time on a dial-up connection. This also may be costly for the service provider, because a server process may be tied up by one client, and unavailable to other clients, for an extreme length of time. Thus there is a need for a system or a method to detect the bandwidth, and then perform a proper action, depending on bandwidth.

SUMMARY OF THE INVENTION

An example of a solution to problems mentioned above comprises automatically measuring bandwidth of a network connection; comparing results of the measuring, with bandwidth parameters; preventing a transfer of a file via the network connection, if measured bandwidth is less than a minimum acceptable value; providing to an end user an option of transferring a file via the network connection, if measured bandwidth is not less than a minimum acceptable value, but is less than an optimal value; and automatically transferring a file via the network connection, if measured bandwidth is greater than or equal to an optimal value.

BRIEF DESCRIPTION OF THE DRAWINGS

A better understanding of the present invention can be obtained when the following detailed description is considered in conjunction with the following drawings. The use of the same reference symbols in different drawings indicates similar or identical items.

DETAILED DESCRIPTION

The examples that follow involve the use of one or more computers and may involve the use of one or more communications networks. The present invention is not limited as to the type of computer on which it runs, and not limited as to the type of network used.

The following are definitions of terms used in the description of the present invention and in the claims:

"Application" means any specific use for computer technology, or any software that allows a specific use for computer technology.

"Bandwidth" means transmission capacity.

"Client" means any application that requests or utilizes a service. Examples of such a service include but are not limited to: information services, transactional services, access to databases, and access to audio or video content.

"Comparing" means bringing together for the purpose of finding any likeness or difference, including a qualitative or quantitative likeness or difference.

"Comparing" may involve answering questions including but not limited to: "Is a measured bandwidth less than a minimum acceptable value?"

"Component" means any element or part, and may include elements consisting of hardware or software or both.

"Computer-usable medium" means any carrier wave, signal or transmission facility for communication with computers, and any kind of computer memory, such as floppy disks, hard disks, Random Access Memory (RAM), Read Only Memory (ROM), CD-ROM, flash ROM, non-volatile ROM, and non-volatile memory.

"Measuring" means evaluating or quantifying.

"Network connection" means a communications path to or through a network.

"Storing" data or information, using a computer, means placing the data or information, for any length of time, in any kind of computer memory, such as floppy disks, hard disks, Random Access Memory (RAM), Read Only Memory (ROM), CD-ROM, flash ROM, non-volatile ROM, and non-volatile memory.

Figure 1:
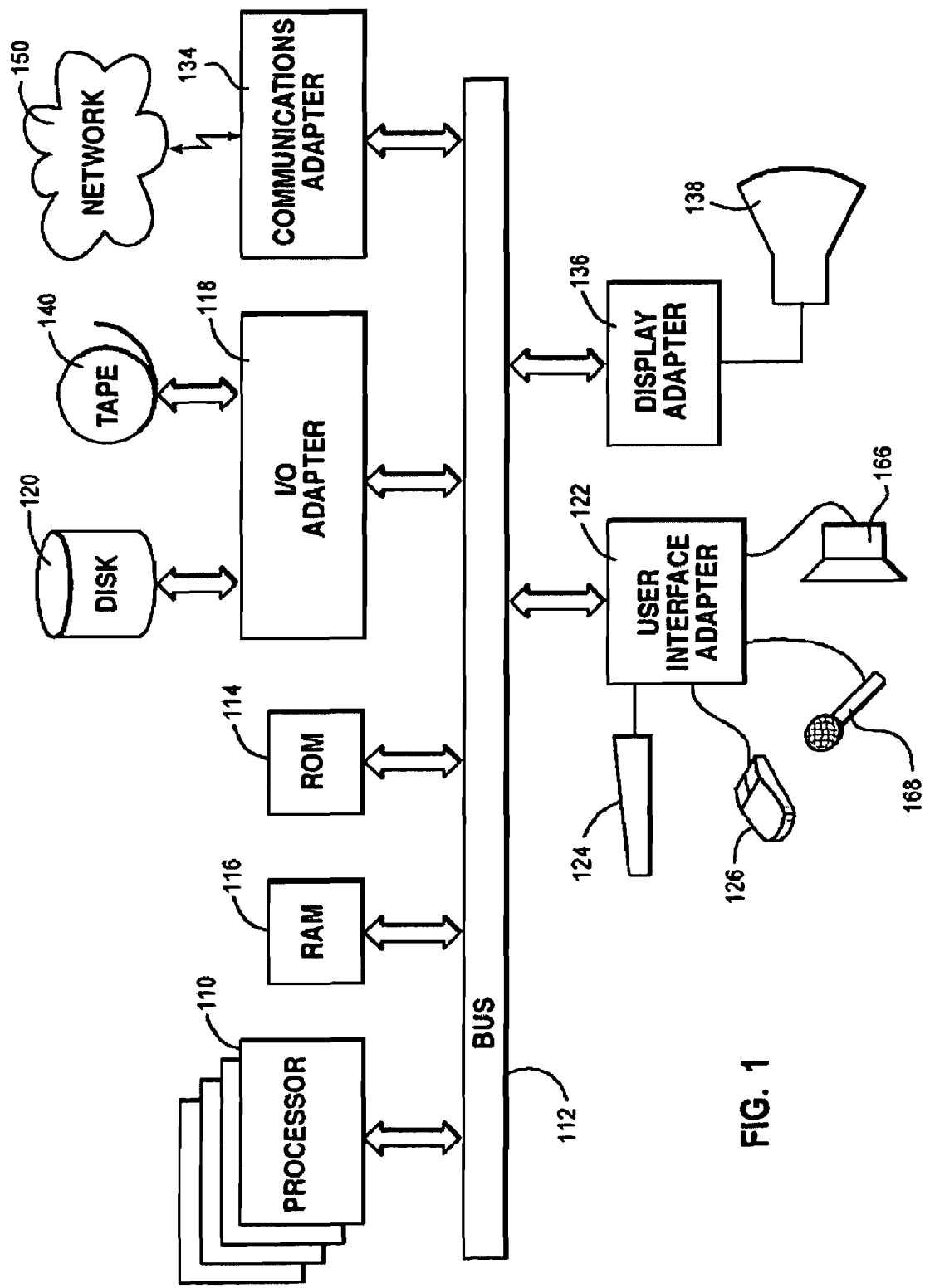
FIG. 1 illustrates a simplified example of a computer system capable of performing the present invention.

FIG. 1 illustrates a simplified example of an information handling system that may be used to practice the present invention. The invention may be implemented on a variety of hardware platforms, including embedded systems, personal computers, workstations, servers, and mainframes. The computer system of FIG. 1 has at least one processor 110. Processor 110 is interconnected via system bus 112 to random access memory (RAM) 116, read only memory (ROM) 114, and input/output (I/O) adapter 118 for connecting peripheral devices such as disk unit 120 and tape drive 140 to bus 112. The system has user interface adapter 122 for connecting keyboard 124, mouse 126, or other user interface devices such as audio output device 166 and audio input device 168 to bus 112. The system has communication adapter 134 for connecting the information handling system to a communications network 150, and display adapter 136 for connecting bus 112 to display device 138. Communication adapter 134 may link the system depicted in FIG. 1 with hundreds or even thousands of similar systems, or other devices, such as remote printers, remote servers, or remote storage units. The system depicted in FIG. 1 may be linked to both local area networks (sometimes referred to as intranets) and wide area networks, such as the Internet.

While the computer system described in FIG. 1 is capable of executing the processes described herein, this computer system is simply one example of a computer system. Those skilled in the art will appreciate that many other computer system designs are capable of performing the processes described herein.

Figure 2:
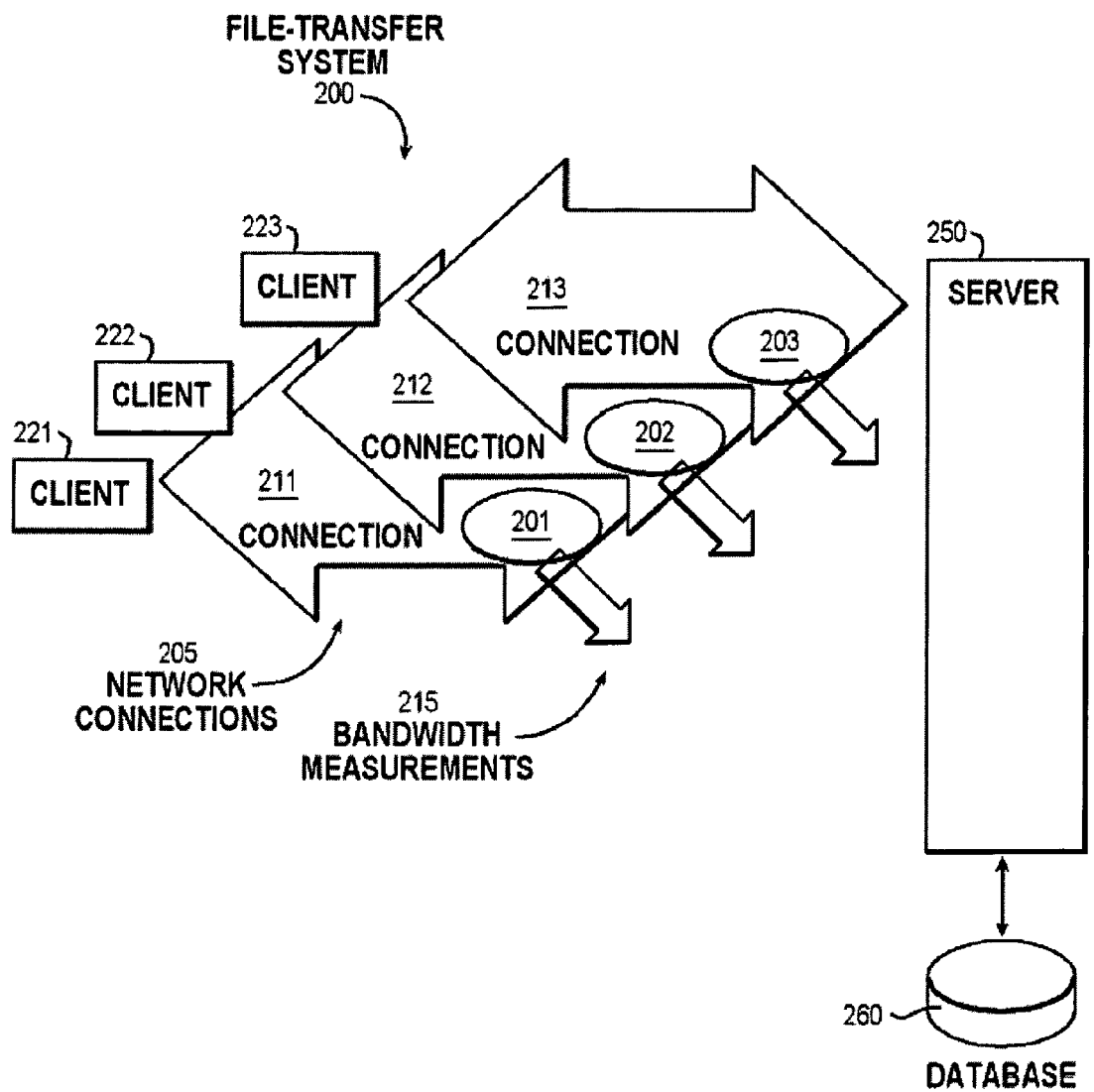
FIG. 2 is a block diagram illustrating an example of method and system of controlling software distribution or file transfer.

FIG. 2 is a block diagram illustrating an example of method and system of controlling software distribution or file transfer. This example gives an introduction to problems of uncontrolled file transfer over various network connections (205), with varying bandwidths. Connection 211 may be dial-up, connection 212 may be satellite, connection 213 may be cable, for example. Thus various network connections (205) have varying capacities to handle software distribution or file transfer. Unfortunately, not every user understands the bandwidth of the connection they are using. If someone were to download a large file, with a network connection of limited bandwidth (e.g. dial-up connection 211), the amount of time it would take to download the large file could be extreme. This may be costly for the owner of client 221, who may be paying for connection time on dial-up connection 211. This also may be costly for the owner of Server 250, because a server process may be tied up by client 221, and unavailable to other clients, for an extreme length of time. Thus there is a need for a system or a method to detect the bandwidth, and then perform proper action, depending on bandwidth. For example, file transfer system 200 may prevent a transfer of a file via network connection 211, if measured bandwidth is less than a minimum acceptable value, or help the user of client 221 to make an informed decision on transferring the file.

Consider some details of this example in FIG. 2. Components 201-203 symbolize means for automatically measuring bandwidth of a network connection. One possible technique is to transfer a small packet of known size, measure the time for the transfer, and extrapolate. Some measurement tools are described in an article by Michael Larson, "Probing Network Characteristics: A Distributed Network Performance Framework," *Dr. Dobb's Journal*, June 2004, page 22, herein incorporated by reference. Larson's framework allows one to diagnose and act on network events as they occur. The framework may be implemented with computers running any of a large variety of operating systems. The source code is available from the web site of Dr. Dobb's Journal. One of Larson's examples is a tool for measuring bandwidth. "Bandwidth is inferred from latency values received for packets of differing sizes—the theory is that a larger packet will encounter more latency due to longer send/receive queues at the Layer 2 level (Ethernet)—where the original data packet is broken down into smaller chunks for transmission over the wire." Larson at page 27.

Server 250 provides means for comparing measured results (symbolized by is arrows at 215), with bandwidth parameters, which may be retrieved from database 260. Server 250, client 222, and network connection 212 provide means for providing to an end user at client 222 an option of transferring a file via network connection 212, if measured bandwidth 215 is not less than a minimum acceptable value, but is less than an optimal value. Server 250 provides means for performing an action such as preventing a transfer of a file via network connection 211, if measured bandwidth 215 is unacceptably low, for example.

Server 250, clients 221-223, and network connections (205) may comprise means for software distribution, movie distribution, transfer of system management data, or transfer of audio or video content, to give a few examples.

Files may be transferred from Server 250 to clients 221-223 for software distribution, or movie distribution. Clients 221-223 also may be referred to as "endpoints," in a context of software distribution, for example. Endpoints at 221-223 may function as clients of server 250 for software distribution, but endpoints at 221-223 also may function as servers, each in its own local area network, for example.

Files may be transferred from clients or endpoints at 221-223 to server 250, for transfer of system management data (e.g. an inventory of installed software), information to be used for debugging, information to be used for advertising, retail point-of-sale data, or other data. For these file transfers also, system 200 detects the bandwidth, and then performs the proper action, depending on bandwidth, as described above.

The example of a method and system of controlling software distribution or file transfer in FIG. 2 is independent of any particular protocol. Transmission Control Protocol/Internet Protocol (TCP/IP) along with File Transfer Protocol (FTP) may be used, for example, or some proprietary protocol for file transfer may be used.

Figure 3A:
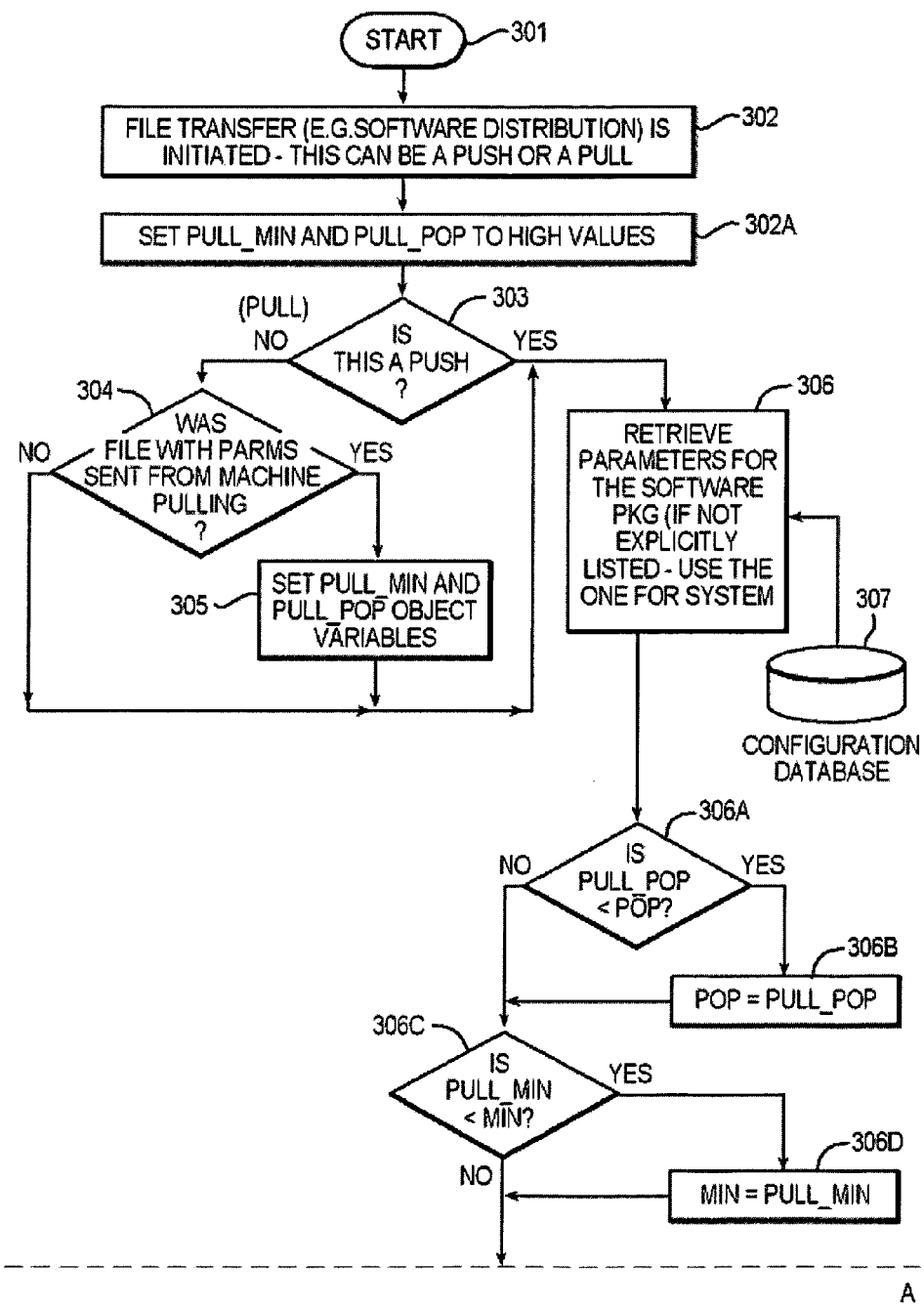
FIGS. 3A and 3B are a flow chart illustrating an example of a method of controlling software distribution or file transfer.
Figure 3B:
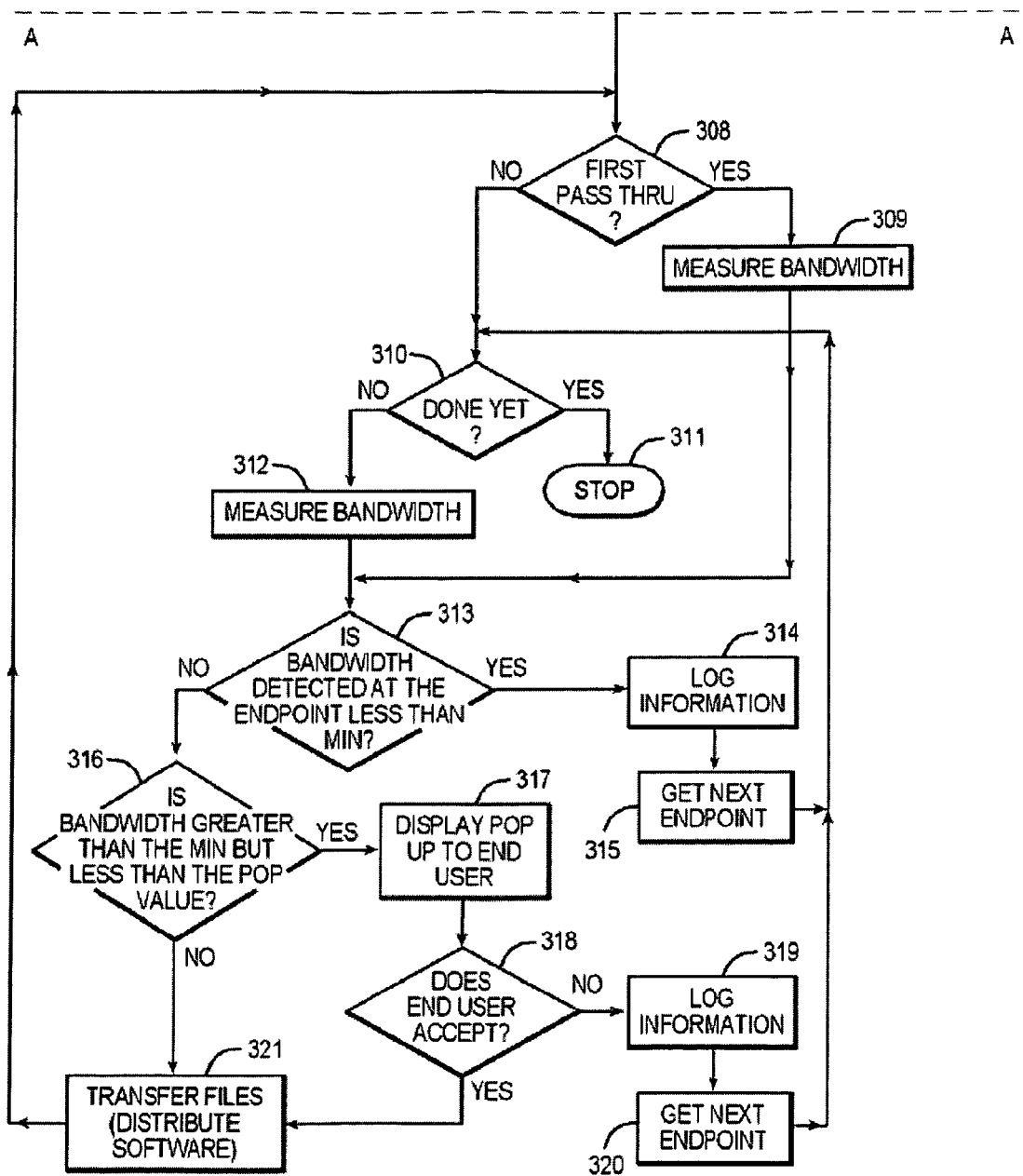

FIGS. 3A and 3B are a flow chart illustrating an example of a method of controlling software distribution or file transfer. Beginning with an overview, FIGS. 3A and 3B illustrate automatically measuring bandwidth (Block 309) of a network connection, comparing the measurement with bandwidth parameters (Decision 313 & Decision 316), and based on this comparison, performing an action. This action may be (Block 321) automatically transferring a file, if measured bandwidth is optimal. This action may be preventing a transfer of a file (Blocks 314-315), if measured bandwidth is unacceptably low. This action may be (Block 317) providing to an end user an option, if measured bandwidth is acceptable but less than optimal. This action may comprise software distribution, movie distribution, transfer of system management data, or transfer of audio or video content.

Continuing with details of FIGS. 3A and 3B, consider an example with a large number of endpoints. Starting at Block 301, endpoints numbered 1-300 may need to receive updated software, in a scheduled operation. In a push operation initiated at Block 302, parallel processes will handle 25 endpoints simultaneously. (Either a push or a pull operation may be initiated at Block 302).

Decision 303 symbolizes the choice between a push or a pull operation. In a push operation, at Decision 303 the "Yes" path is taken to Block 306, and on toward later steps such as automatically measuring bandwidth (Block 309) and comparing results (Decision 313), without receiving a request from an end user for file transfer. If the "Yes" path is taken to Block 306, the bandwidth parameters for this particular software package may be retrieved from a configuration database at 307. There may be a minimum acceptable value ["min" value] and optimal value ["pop" value] for this particular software package, or if not, the system's min and pop values may be used. Here, "pop" value refers to a pop-up message. Block 317 below involves providing a message concerning the measured bandwidth, if measured bandwidth is not less than the minimum acceptable value, but is less than the optimal value.

Configurations in a configuration database at 307 may be set on various levels, such as on the level of the whole system, or on the level of a particular software package, for example. Here is a sample configurations file, with bandwidth parameters expressed in kilobits per second:
System Min 24000 Pop 48000
Package1 Min 28800 Pop 48000

Package2 Min 12000 Pop 24000
Package50 Min 9600 Pop 12000

In a push scenario, at Decision 308, there may be a number of iterations or passes through a routine, to cover a list of endpoints numbered 1-300 that need to receive updated software. If this is the first pass, take the "Yes" path to Block 309.

At Block 309: Measure bandwidth for all endpoints 1-25. At Decision 313 through Block 321: Compare bandwidth with minimum and optimum values, for all endpoints 1-25. Perform the proper action, depending on bandwidth, for all endpoints 1-25: distribute software (321), or do not distribute software (314-315), or display pop up message (317). The preferred action may be preventing a transfer of a file, if measured bandwidth is unacceptably low. If preventing a transfer of a file, the method logs information at Block 314, and goes to the next endpoint (Block 315). Block 317 involves providing a message concerning the measured bandwidth, if measured bandwidth is not less than the minimum acceptable value, but is less than the optimal value, and enabling the end user to accept or reject transferring a file. In response to the pop up, the user may make a decision to accept distribution of the software (take the "Yes" path to Block 321) or not. If the end user does not accept a transfer of a file, the method logs information at Block 319, and goes to the next endpoint (Block 320). Logging information at Blocks 314 or 319 may involve writing a message to a log file, such as "Unable to push to endpoint Number 25 now," for example. The message may include information about the attempted file transfer, such as the name of the file that was not transferred, whether the attempted file transfer was a push or a pull, the bandwidth measurement, and the reason that the attempted file transfer failed.

Suppose that endpoint number 1 finishes the file transfer first. When endpoint number 1 is done, go from Block 321 to Decision 308. At Decision 308, this is not the first pass, so take the "No" branch to 310. At Decision 310: Not done yet, because endpoints 26-300 remain to be handled, so take the "No" branch to Block 312. Preferably, software distribution does not wait till all endpoints 1-25 finish, but as one endpoint finishes, another takes it place and starts the file transfer. (Possibly the operation could wait until endpoints 1-25 finish, but then if one endpoint "hangs", the entire distribution operation hangs.) Regarding Block 312, the second block to measure bandwidth: Typically there is a parameter that states how many endpoints to push to (in a push paradigm) at once. If targeting 300 endpoints, typically the method will not try to push to all 300 endpoints at once, but rather do 25 simultaneous distributions at once, for example. So in the first pass, get the bandwidth of endpoints numbered 1-25 at once (Block 309). Then when each endpoint finishes, (they will not all complete at the same time) pick another of the endpoints left, determine the bandwidth (Block 312) for that one endpoint, and perform the proper action (as described above). Continue for endpoints up to number 300, and when done, take the "Yes" branch from Decision 310 to end the operation at Block 311.

Continuing with details of FIGS. 3A and 3B, consider an example of one endpoint that requests a file transfer (e.g. updated software, or a movie), starting at Block 301. Block 302A, in case of a pull operation, symbolizes initially setting a minimum acceptable value and an optimal value, for bandwidth parameters. At Decision 303 the "No" path is taken toward Decision 304. The "No" path symbolizes receiving from an end user a request that a file be transferred. Decision 304 symbolizes the choice of sending a file having parameters along with a request that a file be transferred. If the "Yes" path is taken, a file (if it is there on the endpoint) is sent with the request. The file contains values that can be used for min and pop. If the "Yes" path is taken, Block 305 sets object variables.

If no file is sent with the request, at Decision 304 the "No" path is taken to Block 306.

In a pull scenario, Decision 306A and Decision 306C symbolize use of the file containing values for min and pop. If the file's min and pop values are less than the system's or the package's min and pop values, the file's values would override the others. Blocks 306B and 306D symbolize overriding.

At Decision 308, this is the first pass, so take the "Yes" path to Block 309. At Block 309: Measure bandwidth for that one endpoint, and perform the proper action (as described above). When done, take the "Yes" branch from Decision 310 to end the operation at Block 311.

Regarding FIGS. 3A and 3B, the order of the operations described above may be varied. For example, putting Decision 303 first is within the practice of the invention. Blocks in FIGS. 3A and 3B could be arranged in a somewhat different order, but still describe the invention. Blocks could be added to the above-mentioned diagram to describe details, or optional features; some blocks could be subtracted to show a simplified example (e.g. showing only Blocks 312-321). This final portion of the detailed description presents some details of a working example implementation that was developed and deployed within IBM as a prototype for software distribution. Rather than utilizing a commercially available tool for bandwidth measurement, we used the known technique mentioned above (transfer a small packet of known size (100 kilobytes), measure the time for the transfer, and extrapolate). We used the same technique for both push and pull operations. In the tests, we used direct local area network connections (no firewall involved), a digital subscriber line (DSL) connection, a cable connection, a hotel dial up connection, and a home dial up connection. We used three software packages that were simply downloaded and not installed, since we did not want to introduce the install time into the test. The packages were: 1) A small test package of 100 kilobytes, 2) A medium package of approximately 6 megabytes, and 3) A large package of over 100 megabytes. The prototype system detected the bandwidth, and then performed an action, depending on bandwidth, as described above.

In summary, we provide here examples of a solution for controlling file transfer. We provide detailed examples involving software distribution.

One of the possible implementations of the invention is an application, namely a set of instructions (program code) executed by a processor of a computer from a computer-usable medium such as a memory of a computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer-usable medium having computer-executable instructions for use in a computer. In addition, although the various methods described are conveniently implemented in a general-purpose computer selectively activated or reconfigured by software, one of ordinary skill in the art would also recognize that such methods may be carried out in hardware, in firmware, or in more specialized apparatus constructed to perform the method.

While the invention has been shown and described with reference to particular embodiments thereof, it will be understood by those skilled in the art that the foregoing and other changes in form and detail may be made therein without departing from the spirit and scope of the invention. The appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the appended claims may contain the introductory phrases "at least one" or "one or more" to introduce claim elements. However, the use of such phrases should not be construed to imply that the introduction of a claim element by indefinite articles such as "a" or "an" limits any particular claim containing such introduced claim element to inventions containing only one such element, even when the same claim includes the introductory phrases "at least one" or "one or more" and indefinite articles such as "a" or "an;" the same holds true for the use in the claims of definite articles.

We claim:

1. A computer system for controlling file transfer, the computer system comprising:
   one or more processors, one or more computer-readable memories, and one or more computer-readable, tangible storage devices;
   program instructions, stored on at least one of the one or more storage devices for execution by at least one of the one or more processors via at least one of the one or more memories, to automatically measure bandwidth of a network connection;
   program instructions, stored on at least one of the one or more storage devices for execution by at least one of the one or more processors via at least one of the one or more memories, to compare results of the measuring with bandwidth parameters;
   program instructions, stored on at least one of the one or more storage devices for execution b at least one of the one or more processors via at least one of the one or more memories, to prevent a transfer of a file between a source device and a destination device in response to the measured bandwidth being less than a minimum acceptable value based on results of the comparing;
   program instructions, stored on at least one of the one or more storage devices for execution by at least one of the one or more processors via at least one of the one or more memories, to provide, to an end user, a displayed message regarding the measured bandwidth and having an option of accepting or rejecting the transferring of the file via the network connection, in response to the measured bandwidth being not less than the minimum acceptable value, but being less than an optimal value based on results of the comparing; and
   program instructions, stored on at least one of the one or more storage devices for execution by at least one of the one or more processors via at least one of the one or more memories, to automatically transfer the file via the network connection, in response to the measured bandwidth being greater than or equal to the optimal value based on results of the comparing.

2. The computer system of claim 1, wherein further comprising:
   program instructions, stored on at least one of the one or more storage devices for execution by at least one of the one or more processors via at least one of the one or more memories, to receive from the end user a request that the file be transferred
   program instructions, stored on at least one of the one or more storage devices for execution by at least one of the one or more processors via at least one of the one or more memories, to automatically measure bandwidth of the network connection;
   program instructions, stored on at least one of the one or more storage devices for execution by at least one of the one or more processors via at least one of the one or more memories, to compare results of the measuring;
   program instructions, stored on at least one of the one or more storage devices for execution by at least one of the one or more processors via at least one of the one or more memories, to prevent the transfer of the file;
   program instructions, stored on at least one of the one or more storage devices for execution by at least one of the one or more processors via at least one of the one or more memories, to provide a displayed message; and
   program instructions, stored on at least one of the one or more storage devices for execution by at least one of the one or more processors via at least one of the one or more memories, to automatically transfer the file as part of a pull operation in response to the end user's request that the file be transferred.

3. The computer system of claim 1, further comprising:
   program instructions, stored on at least one of the one or more storage devices for execution by at least one of the one or more processors via at least one of the one or more memories, to automatically measure bandwidth of the network connection;
   program instructions, stored on at least one of the one or more storage devices for execution by at least one of the one or more processors via at least one of the one or more memories, to compare results of the measuring;
   program instructions, stored on at least one of the one or more storage devices for execution by at least one of the one or more processors via at least one of the one or more memories, to prevent the transfer of the file;
   program instructions, stored on at least one of the one or more storage devices for execution by at least one of the one or more processors via at least one of the one or more memories, to provide a displayed message; and
   program instructions, stored on at least one of the one or more storage devices for execution by at least one of the one or more processors via at least one of the one or more memories, to automatically transfer the file as part of a push operation for pushing the file to the destination device from the source device.

4. The computer system of claim 1, further comprising program instructions, stored on at least one of the one or more storage devices for execution by at least one of the one or more processors via at least one of the one or more memories, to retrieve the bandwidth parameters, for a software package, from a database.

5. The computer system of claim 1, further comprising program instructions, stored on at least one of the one or more storage devices for execution by at least one of the one or more processors via at least one of the one or more memories, to transfer the file as part of at least one of software distribution, digital movie distribution, transfer of system management data, transfer of audio content, or transfer of video content.

6. The computer system of claim 1, wherein the source device is a server and wherein the destination device is a client computing device.

7. The computer system of claim 1, wherein the file comprises at least one of information to be used for debugging, information to be used for advertising, or retail point-of-sale data.

8. The computer system of claim 1, further comprising:
program instructions, stored on at least one of the one or more storage devices for execution by at least one of the one or more processors, via at least one of the one or more memories, to log information in a log file indicating an inability to transfer the file in response to the end user rejecting the transfer of the file.

9. The computer system of claim 8, wherein the information in the log file comprises a name of the file that was not transferred, whether the attempted file transfer was part of a push operation or a pull operation, the bandwidth measurement of the network connection, and a reason that the attempted file transfer failed.

10. A computer program product for controlling a file transfer, the computer program product comprising:
one or more computer-readable, tangible storage devices;
program instructions, stored on at least one of the one or more storage devices, to automatically measure bandwidth of a network connection;
program instructions, stored on at least one of the one or more storage devices, to compare results of the measuring with bandwidth parameters;
program instructions, stored on at least one of the one or more storage devices, to prevent a transfer of a file between a source device and a destination device in response to the measured bandwidth being less than a minimum acceptable value based on results of the comparing;
program instructions, stored on at least one of the one or more storage devices, to provide, to an end user, a displayed message regarding the measured bandwidth and having an option of accepting or rejecting the transferring of the file via the network connection, in response to the measured bandwidth being not less than the minimum acceptable value, but being less than an optimal value based on results of the comparing; and
program instructions, stored on at least one of the one or more storage devices, to automatically transfer the file via the network connection, in response to the measured bandwidth being greater than or equal to the optimal value based on results of the comparing.

11. The computer program product of claim 10, further comprising:
program instructions, stored on at least one of the one or more storage devices, to receive from the end user a request that the file be transferred;
program instructions, stored on at least one of the one or more storage devices, to automatically measure bandwidth of the network connection;
program instructions, stored on at least one of the one or more storage devices, to compare results of the measuring;
program instructions stored on at least one of the one or more storage devices, to prevent the transfer of the file;
program instructions, stored on at least one of the one or more storage devices, to provide a displayed message; and
program instructions, stored on at least one of the one or more storage devices, to automatically transfer the file as part of a pull operation in response to the end user's request that the file be transferred.

12. The computer program product of claim 10, further comprising:
program instructions, stored on at least one of the one or more storage devices, to automatically measure bandwidth of the network connection;
program instructions, stored on at least one of the one or more storage devices, to compare results of the measuring;
program instructions, stored on at least one of the one or more storage devices, to prevent the transfer of the file;
program instructions, stored on at least one of the one or more storage devices, to provide a displayed message; and
program instructions, stored on at least one of the one or more storage devices, to automatically transfer the file as part of a push operation for pushing the file to the destination device from the source device.

13. The computer program product of claim 10, further comprising program instructions, stored on at least one of the one or more storage devices, to retrieve the bandwidth parameters, for a software package, from a database.

14. The computer program product of claim 10, further comprising program instructions, stored on at least one of the one or more storage devices, to transfer the file as part of at least one of software distribution, digital movie distribution, transfer of system management data, transfer of audio content, or transfer of video content.

15. The computer program product of claim 10, wherein the source device is a server and wherein the destination device is a client computing device.

16. The computer program product of claim 10, wherein the file comprises at least one of information to be used for debugging, information to be used for advertising, or retail point-of-sale data.

17. The computer program product of claim 10, further comprising program instructions, stored on at least one of the one or more storage devices, to log information in a log file indicating an inability to transfer the file in response to the end user rejecting the transfer of the file.

18. The computer program product of claim 17, wherein the information in the log file comprises a name of the file that was not transferred, whether the attempted file transfer was part of a push operation or a pull operation, the bandwidth measurement of the network connection, and a reason that the attempted file transfer failed.

* * * * *